(12) United States Patent
Mahyar et al.

(10) Patent No.: US 10,455,297 B1
(45) Date of Patent: Oct. 22, 2019

(54) CUSTOMIZED VIDEO CONTENT SUMMARY GENERATION AND PRESENTATION

(71) Applicant: Amazon Technologies, Inc., Seattle, WA (US)

(72) Inventors: Hooman Mahyar, Los Angeles, CA (US); Harshal Dilip Wanjari, Issaquah, WA (US); Vimal Bhat, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/116,618

(22) Filed: Aug. 29, 2018

(51) Int. Cl.
*H04N 21/8549* (2011.01)
*H04N 21/45* (2011.01)
*G06K 9/00* (2006.01)
*G10L 25/51* (2013.01)
*G10L 15/22* (2006.01)
*G10L 15/18* (2013.01)
*G10L 15/08* (2006.01)

(52) U.S. Cl.
CPC ..... *H04N 21/8549* (2013.01); *G06K 9/00718* (2013.01); *G06K 9/00751* (2013.01); *G06K 9/00765* (2013.01); *G10L 15/1815* (2013.01); *G10L 15/22* (2013.01); *G10L 25/51* (2013.01); *H04N 21/4532* (2013.01); *G06K 2009/00738* (2013.01); *G10L 2015/088* (2013.01)

(58) Field of Classification Search
None
See application file for complete search history.

(56) References Cited

U.S. PATENT DOCUMENTS 9,244,924 B2 * 1/2016 Cheng ..................... G06F 16/73
9,961,403 B2 * 5/2018 Kritt ..................... G06F 3/0484

\* cited by examiner

*Primary Examiner* — Omar S Parra
(74) *Attorney, Agent, or Firm* — Eversheds Sutherland (US) LLP

(57) ABSTRACT

Systems, methods, and computer-readable media are disclosed for systems and methods for customized video content summary generation. Example methods may include determining a first segment of digital content including a first set of frames, first textual content, and first audio content. Example methods may include determining a first event that occurs in the first set of frames, determining a first theme of the first event, generating first metadata indicative of the first theme, and determining a meaning of a first sentence that occurs in the first textual content. Some methods may include determining a second theme of the first sentence, generating second metadata indicative of the second theme, determining that user preference data associated with an active user profile includes the first theme and the second theme, generating a video summary that includes a portion of the first segment of digital content, and presenting the video summary.

20 Claims, 8 Drawing Sheets

CUSTOMIZED VIDEO CONTENT SUMMARY GENERATION AND PRESENTATION

BACKGROUND

Certain digital content, such as movies, television shows, and other video content may be available via streaming. For example, users may stream movies, television series, and so forth using streaming devices, such as smartphones, televisions, etc. However, a selection of available content may be large, and the user may have difficulty in selecting content for consumption. To determine whether to select content, a user may view a trailer or other preview of certain content. For example, the user may watch a movie trailer before deciding whether to stream (e.g., rent, buy, etc.) the movie. However, trailers or other previews of content may not include portions of content that may be relevant to the user, or that may be of interest to the user.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
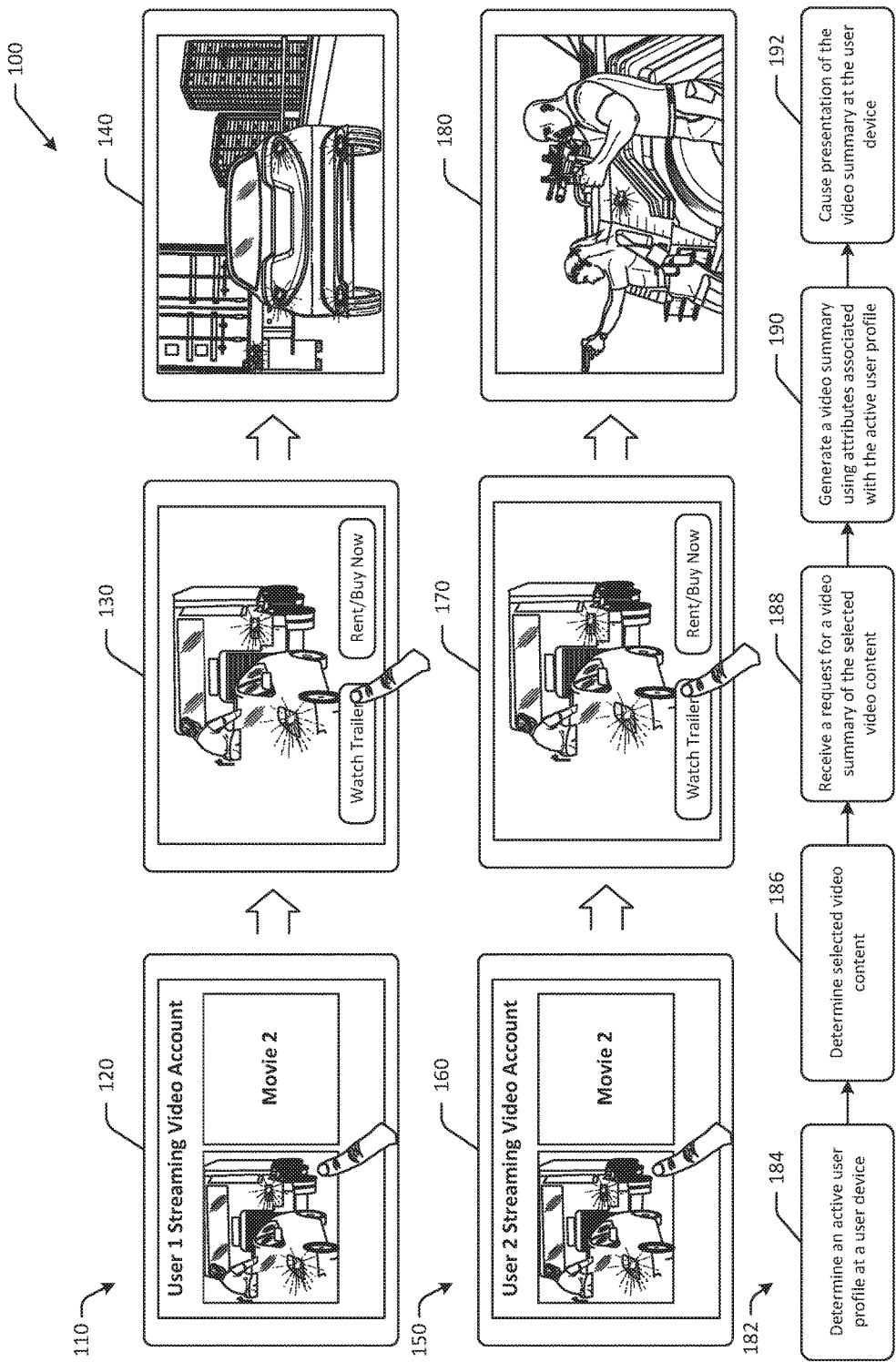
FIG. 1 is a schematic illustration of an example use case for customized video content summary generation and presentation in accordance with one or more example embodiments of the disclosure.

Digital content may include video content, such as movies, television shows, streaming shows (e.g., made for Amazon Prime, Netflix, etc.), and other video content. To determine whether content is of interest to a user, the user may desire to view or otherwise consume a preview of the content. For example, before streaming or otherwise consuming a movie, the user may consume a trailer for the movie. In another example, the user may preview a series of content with a trailer or other summarization of the story line of the series (e.g., "last season on Sneaky Pete," "next season on Sneaky Pete," etc.). However, the content of the video preview may not include content, themes, scenes, or other portions of content that may be relevant to, or of interest to, the user. For example, the user may like action movies, yet a trailer for a movie may include some or little action scenes from a movie, and may instead focus on dramatic portions of the movie. The trailers or other video summaries may therefore be a one-size-fits-all type of summary. Such summaries may not be attractive to some or all users because not all users may desire to preview the same type of scenes, themes, and/or portions of content than others.

In some instances, cover art or music associated with content may be customized at a user interface at which a user can select content, but may not significantly impact a user's decision of whether or not to consume content, as the user may still consume a content summary prior to consuming the content. The content summary may be generic and may not highlight portions of the content that may be of interest to the user.

Embodiments of the disclosure include systems and methods to automatically generate customized video content summaries that may account for specific user preferences and/or interests. Certain embodiments generate content summaries by automatically separating content into semantic clips and clustering and labeling some or each semantic clip into actions and adverbs. Semantic clips may be sequential or non-sequential portions of content, such as a movie, that may narrate a continuous story. For example, non-stop and/or ongoing conversation between two people, non-stop and/or ongoing car chasing, fighting, etc. Content may include one or more semantic clips that are happening in different locations and/or times with different people. The length of each semantic clip can be anywhere from a few seconds to more than 10 minutes.

In some embodiments, content may be separated into segments using one or more video processing algorithms, text processing algorithms, and/or audio processing algorithms to identify and/or determine scenes that may take place in various portions of the content. The identified segments may be analyzed to determine the most important portions of the segments (which may or may not be the entire segment). Importance or relevance to a certain theme may be determined using one or more scores generated for the segment. For example, a video score may be generated for the segment or for portions of the segment indicative of various activities or events that occur in the video, objects that appear, and other video-based features of the video content. In another example, an audio score may be generated for the segment or for portions of the segment indicative of various audio features that may occur during the segment, such as dialog, sound effects, music, and/or other audio features. Other scores may be used.

The generated score(s) may be used to rank segments and/or portions of segments of content to determine relative importance to the content and/or relevance to a theme for the content summary that is being generated. For example, a user may prefer to consume romantic content. Accordingly, segments of content that include romance-themed events or occurrences may be scored relatively higher than other segments of content, such as action-themed segments of the same content. If a content summary was being generated for the same content for a different user, such as a user that prefers to consume action-themed content, the action-themed segments may be scored relatively higher than the romance-themed content.

In some embodiments, portions of a segment may be scored individually, while in other embodiments, a segment may be scored, or a combination thereof. For example, a segment may be a scene that has a total length of 3 minutes. However, during the 3 minute scene, the actors may have different interactions or dialog. Some embodiments may score the portions of the scene that have a certain type of dialog, such as certain keywords or phrases, or an intensity of conversation (e.g., as determined based at least in part on frequency, volume, etc. via text or audio analysis) relatively higher than other portions of the segment where there is less important dialog or events that occur. In this manner, the more important and/or relevant portions of a segment may be identified. In some embodiments, aggregate scores for a segment may be determined by averaging scores for portions of segments, aggregating or adding scores of portions together to determine a score for the segment, and so forth.

The scores may be used to select segments and/or portions of segments for inclusion in a content summary. For example, a content summary may include segments or portions of segments stitched together in a continuous video to form a summary, such as a movie trailer. The content summary may be formatted into a video file, for example, and sent to or otherwise made available for retrieval by a user device. The video file may be presented to a user for consumption.

In some embodiments, a desired length of a content summary may be used to determine which segments or portions of segments are to be included in the content summary. For example, longer content summaries may include longer portions of segments or a greater number of segments than shorter content summaries. Content summary length may be determined, in one example, based at least in part on user preference and/or actual content summary consumption data. Accordingly, segments and/or portions of segments may be ranked based at least in part on the corresponding video and/or audio scores, and the higher or top ranked segments may be included in the content summary, with additional segments being included until a desired length of content summary is reached.

To generate the content summary, in one example, the portions of the content (whether complete segments or portions of segments) may be extracted from a content file for the content, and may include one or more of audio content, text content, and/or video content. The extracted content may be joined or otherwise combined into a single continuous video and may be stored, in one example, in a suitable video file format. In some embodiments, theme music or other music associated with the content or in a music library may be used as background music for the content summary and may be included in the video file. The video file may be streamed to a user device or otherwise provided for consumption by the user.

This disclosure relates to, among other things, devices, systems, methods, computer-readable media, techniques, and methodologies for customized video content summary generation and presentation. Certain embodiments may automatically generate custom content summaries for digital content, such as video content (e.g., movies, television programs, streaming content, etc.), based at least in part on user data, such as user preference data indicative of types of content the user prefers to consume. Certain embodiments generate content summaries using, for example, analysis of audio, video, and text (e.g., closed captioning, synopses, metadata, etc.) components of digital content, such as a movie, video, other digital content. Certain embodiments determine aspects of content summaries, such as length and/or scene selection, using machine learning and other methodologies. In some instances, machine learning (e.g., deep neural networks, long short term memory units and/or recurrent neural networks, etc.) may be used to identify various elements of content that may increase a rate of conversion for users that consume a content summary.

Referring to FIG. 1, an example use case 100 for customized video content summary generation is depicted in accordance with one or more example embodiments of the disclosure. For example, at a first instance 110, a first user interface 120 may be presented to a first user at a first user device. The first user interface 120 may include a selection of content, such as streaming content including movies and shows, which is available for consumption for the user. The available content may be represented by respective tiles or content cards, which may include icons, images, artwork, titles, and/or other information associated with the content. The first user may view the available content and may select one of the tiles. For example, the first user may select a content card associated with a racecar movie. One or more remote servers may determine that the content card associated with the digital content, or racecar movie in this example, is selected at the user interface, where one or more, or multiple, content cards are presented at the user interface. In some instances, presentation of the video summary may be caused at the content card (e.g., in line or without redirecting the user interface, etc.), while in other instances, the video summary may be at a different user interface.

A second user interface 130 may be presented at the first user device to the first user. The second user interface 130 may include additional details about the racecar movie, such as a synopsis, actor information, running length, user ratings, and/or other information. The second user interface 130 may include one or more options, such as selectable options. For example, the second user interface 130 may include a first selectable option to watch a trailer for the movie, and a second selectable option to begin consumption of the movie, such as by buying or renting the movie for streaming.

The first user may select the "watch trailer" option. Based at least in part on user preferences, which may be determined using an active user profile, a device identifier, a user account identifier (e.g., the account information of the first user or the user that is currently logged in or activated, etc.), and/or another identifier, a customized content summary, which in the example of FIG. 1 may be a movie trailer, may be generated. For example, based at least in part on an active user profile or account, user preferences associated with the user may be determined. User preferences be identified using user preference data and may indicate a type of content the user enjoys consuming (as indicated by previous purchases and/or interactions such as reading reviews, watching previews, etc.), a length of content summary that the user consumes (as indicated by previously consumed content summaries), themes or scenes that the user may be interested in (e.g., romance themes, car chase scenes, etc.), and/or other user preferences.

Using the user preference data for the first user, in the example of FIG. 1, a remote server may determine that the first user is interested in cars and drama. For example, the first user may have consumed several episodes of Grand Tour or another car-based show, as well as performed searches for car related information. In addition, the first user may have consumed several movies in a drama theme or category of content. Accordingly, the remote server may determine that the user enjoys cars and drama-themed content.

The racecar movie selected by the first user may be categorized as a certain theme of content, such as an action theme, but may nonetheless have portions that are drama-themed, romance-themed, or other themes of content. However, because the general category of the movie may be an action theme, a generic trailer may be action-heavy or focused on action in the film. In the example of FIG. 1, however, the first user may be less interested in action, and more interested in drama, as indicated by the user preference data for the first user. Accordingly, a customized content summary may be generated by the remote server for the first user. The content summary may include portions of the movie that correspond to cars and drama. The content summary may be presented to the first user at the first user device. For example, at a third user interface 140, the content summary may be presented at the first user device. The content summary may include portions of the movie that show cars in action, or scenes where cars are the primary object in the scene.

In contrast, at a second instance 150, a fourth user interface 160 may be presented to a second user at a second user device. The fourth user interface 160 may be the same as the first user interface 120 that was presented to the first user in the first instance 110. The second user may also select a content card associated with the racecar movie.

A fifth user interface 170 may be presented at the second user device to the second user. The fifth user interface 170 may be the same as the second user interface 130. The second user may also select the "watch trailer" option. However, the second user may have different user preferences than the first user, which may be indicated by the user preference data associated with the user account of the second user. For example, the second user may prefer action-themed content and gunfights. Accordingly, based at least in part on user preferences, the remote server may generate a content summary, or movie trailer in this example, that includes action scenes from the racecar movie, as well as gunfights if they exist in the movie. The content summary may be presented at the second user device. As illustrated at a sixth user interface 180, the content summary may include a gunfight scene, which may be more relevant to the second user than a car scene or a dramatic scene that may be more enjoyable or interested to the first user.

As a result, the first user and the second user may receive different content summaries that may include portions of the selected content that are relatively more relevant to the specific user's interests and/or preferences. The respective users may therefore make a more informed decision of whether or not to consume the racecar movie using the tailored content summary or movie trailer. Embodiments of the disclosure may therefore generate content summaries that include the portions of content that are most relevant to a specific user. Not all content may have action scenes, dramatic scenes, etc., so certain embodiments may rank portions of content and use the ranking to select content for inclusion in a content summary.

In some embodiments, several content summaries for the same content may be generated, and a selection of a certain summary may be made based at least in part on user preference data. In other embodiments, customized content summaries (which may include customization to previously generated content summaries) may be generated for users.

To generate customized content summaries of content, an example process flow 182 is presented and may be performed, for example, by one or more summary generation engines at one or more remote servers. The remote server and/or computer system may include at least one memory that stores computer-executable instructions and at least one processor configured to access the at least one memory and execute the computer-executable instructions to perform various actions or operations, such as one or more of the operations in the process flow 182 of FIG. 1.

At a first block 184, an active user profile may be determined at a user device. For example, an active user profile may be determined using an account identifier for an account associated with a device and/or that is logged in at the device or in an active session, a profile that is selected from a set of profiles associated with a user account, and/or another identifier. The active user profile may be associated with user preference data that is indicative of user preferences such as genres of content the user is interested in, viewing habits and/or historical content consumption data (e.g., content previously selected for consumption, etc.), and/or other user preferences.

At a second block 186, selected video content may be determined. For example, the user may select certain video content for additional information and/or for which a content summary is desired.

At a third block 188, a request for a video summary of the selected video content may be received. For example, the user may select a "watch trailer" or other option indicative of a request for a video summary. The remote server may receive the request for the video summary.

At a fourth block 190, a video summary may be generated using attributes associated with the active user profile. For example, the remote server may determine the user preference data associated with the active user profile. The user preference data may include, or be indicative of, attributes of the user such as genres of video that the user generally consumes, or a preferred content theme associated with the active user profile. In an example, the preferred content theme may represent a majority of themes of the content previously selected for consumption by the user profile. To generate the video summary, the remote server may determine video, audio, and/or text files associated with the content. The respective files may be parsed and/or separated and semantic clips (also referred to as "segments" herein) may be identified and extracted. The semantic clips may be discrete portions of the content that are related to each other, such as part of the same scene, same location, same event, and/or other relationship. The semantic clips may be processed, as described herein, and may be associated with data tags, labels, or other metadata indicative of various features of the respective semantic clip. For example, metadata indicating that a certain clip is categorized as action-themed, includes cars, and has loud sounds may be associated with a semantic clip of a car chase scene. In another example, a semantic clip that shows two people kissing each other on the beach during sunset may be associated with metadata indicative of labels such as love, romance, couple, intimacy, attachment, sea, ocean, beach, sunset, etc. Generating metadata for the semantic clips may allow for interpretation and/or understanding of the type of story and elements such as people, location, time, objects, (e.g., clothes, color of clothes, etc.) and some other information about the type of capturing like camera shot type (e.g., medium shot, close-up shot, high angle shot, over the shoulder shot, etc.).

In some embodiments, scores may be generated for semantic clips. For example, a video score may be generated for a semantic clip that represents an importance of objects and/or human actions that occur during the specific clip. Video scores may be used to rank the most important visual elements and/or actions (e.g., shooting, kissing, falling, car accident, etc.) in semantic clips.

In another example, an audio/text score may be generated for the semantic clip that represents an importance of dialog and/or sounds that occur during the specific clip. The audio score may also be based at least in part on text data, which may be used to determine dialog (e.g., by using conversation data such as subtitles, audio processed using speech to text processing, etc.). In some embodiments, conversations or dialog of semantic clips may be analyzed. For example, a semantic role labeling module may be used to analyze, such as parse and process, subtitles, topics, synopses, and/or other text data associated with the content to determine the presence of text features, such as certain language or themes that appear in the content. The semantic role labeling output may be used to understand dialog and to generate an audio/text score for the semantic clip. The audio/text score may be used to determine which dialog and/or sentences are the most important part of the clip, and optionally, what kind of message is being delivered by the dialog. Video scores and audio scores are discussed in detail below.

The respective semantic clips or segments may be ranked using one or both the audio and video scores, or a combination thereof, and the ranking values may be used to determine which segments or portions of segments are to be included in a content summary. In some embodiments, portions of semantic clips may be extracted and included in the content summary.

For example, if an action-themed summary is to be generated, visual action scenes, such as car chasing, fighting, bloody scenes, and dialog scenes that include conversational semantic clips like "I will kill you," "if it bleeds we can kill it," etc. may be extracted as candidate semantic clips. Candidate semantic clips may be ranked using one or more scores and the metadata associated with the respective clips. Metadata may be used to determine the relevancy of certain semantic clips to the type of summary being generated, and scores may be used to determine importance. Scores may be used to select the best part or most important parts of some or all candidate semantic clip. In some embodiments, recurrent neural networks may be used to model the variable-range dependencies that may be used in the task of video summarization.

At a fifth block 192, presentation of the video summary may be caused at the user device. For example, the customized content summary may be stored as a video file and sent to or downloaded by the user device, and the user device may present the customized content summary. The user may consume the content summary and, if interested in the content, may purchase and/or consume the content.

Embodiments of the disclosure may include customized video content summary generation, and may include one or more modules that can be used to analyze digital content.

Some embodiments may output customized content summaries. Certain embodiments may use one or more detection modules or algorithms (e.g., object recognition modules, pattern recognition algorithms, etc.) to identify or detect the presence of one or more features in the content. Features may include, for example, the presence of certain objects, the occurrence of certain actions or events, certain sounds in an audio file or audio component of the content, certain language in a text file or text component of the content, and so forth. One or more detection modules may be used to process and/or detect various features in the content. In some instances, a module may perform more than one form of analysis.

Example embodiments of the disclosure provide a number of technical features or technical effects. For example, in accordance with example embodiments of the disclosure, certain embodiments of the disclosure may automatically analyze audio, video, and/or text components of content. Certain embodiments may recognize or identify presence of certain objects and/or presence of certain themes or types of content and may use one or more machine learning modules or algorithms. As a result of improved functionality, customized content summaries may be generated and may include content that may be more relevant to users. Embodiments of the disclosure may improve computing efficiency and bandwidth by reducing a length of content summaries based at least in part on actually consumed portions of the summary, resulting in reduced file size. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Process and Use Cases

Figure 2:
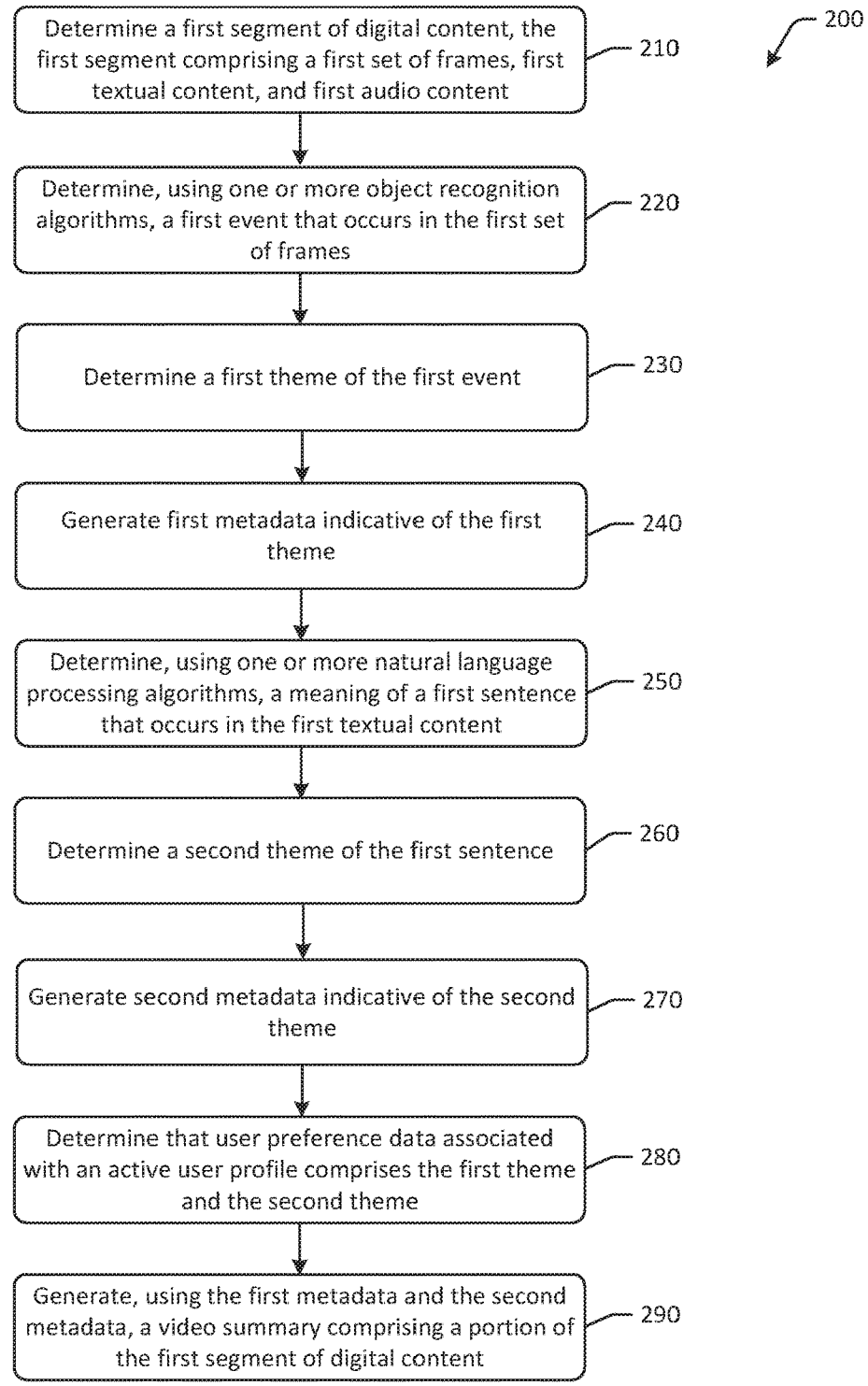
FIG. 2 is a schematic illustration of an example process flow for customized video content summary generation in accordance with one or more example embodiments of the disclosure.

FIG. 2 depicts an example process flow 200 for customized video content summary generation in accordance with one or more example embodiments of the disclosure. While example embodiments of the disclosure may be described in the context of movies or other video content, it should be appreciated that the disclosure is more broadly applicable to any type of digital content. Some or all of the blocks of the process flows in this disclosure may be performed in a distributed manner across any number of devices. The operations of the process flow 200 may be optional and may be performed in a different order.

At block 210 of the process flow 200, computer-executable instructions stored on a memory of a device, such as a remote server or a user device, may be executed to determine a first segment of digital content, the first segment comprising a first set of frames, first textual content, and first audio content. For example, a content processing engine and/or one or more content scanning modules at a remote server may determine a first segment of digital content. The first segment may be a video segment of video content, and may be associated with text and/or audio components. The first segment may be a continuous segment or non-continuous segments that are related. For example, a scene in the content may be interrupted by a flashback or other scene, and may subsequently resume. Segments may correspond to events, scenes, and/or other occurrences that may be discrete and/or extractable from the content. In some instances, segments may correspond to certain locations and/or times, certain actors that appear, certain music or sounds, and/or other features of the content. For example, the remote server may determine a first clip or a first segment of a movie using content data associated with the movie, such as video analysis data. The first clip may be a continuous portion of the movie corresponding to a first scene of the movie that occurs from a first timestamp to a second timestamp. The content scanning engine of the remote server may determine the respective timestamps for segments. Some segments may have more than one set of start and stop timestamps. For example, a scene may be interrupted and then resume later, in which case there may be more than one pair of start and stop timestamps.

To determine the first segment, the remote server may extract and/or analyze individual frames of video content to determine whether the frames are part of the same segment or a different segment. Analysis of frames may include processing images using one or more object recognition algorithms, determining pixel color values, comparing certain portions of frames to previous or subsequent frames in the video, and the like. In one example, an automobile object recognition algorithm may be used to determine that there is a car present in a first frame of a video. In another example, a firearm detection module or algorithm may be used to determine that gun violence or a firearm is present in a first frame of a video. One or more object recognition algorithms may be used on individual frames or sets of frames in a video. The determined objects or features may be outputs of the respective modules or algorithms.

At block 220 of the process flow 200, computer-executable instructions stored on a memory of a device, such as a remote server or a user device, may be executed to determine, using one or more object recognition algorithms, a first event that occurs in the first set of frames. For example, the content processing engine and/or one or more content scanning modules at a remote server may determine a first event that occurs in the first set of frames using one or more object recognition algorithms. Events may be determined based at least in part on objects that are present in video content and/or human poses or activities that occur during scenes. For example, an action and/or human pose detection module may be used to analyze the video and/or audio of the content in a frame-by-frame or segment-by-segment analysis to detect the presence of human actions. Certain embodiments may include a facial recognition module that may be used to analyze video and/or audio of the content in a frame-by-frame or segment-by-segment analysis to detect the presence of facial sentiment, emotional state, and the like. Facial sentiment and/or emotional state may be used to determine a theme or type of segment. For example, angry sentiment may indicate an action segment, while an emotional state of love may be indicative of a romance segment.

At block 230 of the process flow 200, computer-executable instructions stored on a memory of a device, such as a remote server or a user device, may be executed to determine a first theme of the first event. For example, the content processing engine and/or one or more content scanning modules at a remote server may determine the first theme of the first event. The first theme may be determined based at least in part on the first event. For example, the theme may be determined based at least in part on the detection of certain human actions that occur during the segment, certain objects that appear in the first segment or scene, certain types of conversations and/or dialog that occurs, and/or other factors. Themes may be selected from a predetermined set of themes and may optionally correspond to content genres. For example, a theme of a segment or a first event may be action, comedy, romance, drama, and so forth. In some instances, themes may be related to the events that occur in a segment, such as gunfight, violence, kissing, crying, and so forth. In some embodiments, more than one theme may be determined for a specific event and/or segment. A segment may include multiple events, and may therefore be associated with multiple themes.

At block 240 of the process flow 200, computer-executable instructions stored on a memory of a device, such as a remote server or a user device, may be executed to generate first metadata indicative of the first theme. For example, the content processing engine and/or one or more content scanning modules at a remote server may generate a data tag, data label, or other metadata that is associated with the respective segment. For example, the metadata for a segment with two people kissing each other on the beach during sunset may be associated with metadata indicative of labels such as love, romance, couple, intimacy, attachment, sea, ocean, beach, sunset, etc.

At block 250 of the process flow 200, computer-executable instructions stored on a memory of a device, such as a remote server or a user device, may be executed to determine, using one or more natural language processing algorithms, a meaning of a first sentence that occurs in the first textual content. For example, the content processing engine and/or one or more content scanning modules at a remote server may determine text content or a text file associated with the video. The text file may be a subtitles file, metadata including a synopsis of the video or portions of the video, actor data, and the like. In some instances, the text file may be generated based at least in part on the audio file of the video (e.g., a speech-to-text conversion of portions of the audio file of the video, etc.). Natural language processing and/or character detection modules or algorithms may be used to determine features such as sentiment of the text, certain predetermined words or phrases (e.g., verbs, keywords, etc.), and other text-based features. For example, a subtitle text file associated with the video may be processed or analyzed using one or more natural language processing algorithms, and a remote server may determine the presence of certain phrases or sentences in the text file.

In some embodiments, audio content associated with the content may be used in addition to, or instead of, text content to determine sentences that occur in a segment. For example, a remote server may analyze an audio file corresponding to a video. The audio file may include audible sounds, such as dialog, sound effects, soundtrack music, and the like corresponding to the video component of the video. For example, audio may be processed to extract dialog (e.g., filtered to remove sound effects, music, etc.), and the extracted dialog may be processed using speech-to-text processing algorithms. The output may be processed using natural language processing. In an example, an audio processing module may be used to determine the presence of dialog, sound effects, and other instances of audio events that may be used to determine themes of content in a segment. For example, the audio processing module may parse or segment audio associated with the content and identify events or instances of certain indicators or occurrences, such as ocean waves, fire trucks, ambulances, screams, and other audio that may be indicative of actions or events occurring during the segment.

In some embodiments, audio content may be segmented into one or more discrete portions for classification and/or analysis. For example, segments may be classified as music, dialog, sound effects, and so forth. Differently classified portions may be analyzed using different signal processing and/or speech-to-text profiles. In some embodiments, natural language processing may be used to determine a meaning of certain portions of audio. In one example, an audio processing algorithm may be used to determine presence of an explosion feature in the audio file. In another example, the same or a different audio processing algorithm may be used to determine presence of screams in the audio file. In another example, presence of audio indicative of a gunshot in the audio file may be determined using a violence audio recognition model.

At block 260 of the process flow 200, computer-executable instructions stored on a memory of a device, such as a remote server or a user device, may be executed to determine a second theme of the first sentence. For example, the content processing engine and/or one or more content scanning modules at a remote server may determine the second theme of the first sentence. The second theme may be determined based at least in part on the context and substance of the sentence. For example, the theme may be determined based at least in part on the detection of certain verbs that occur during dialog, certain sound effects that are present in the first segment or scene, certain types of conversations and/or dialog that occurs, and/or other factors. The second theme may be the same as, or different than the first theme. The second theme may be selected from the predetermined set of themes.

At block 270 of the process flow 200, computer-executable instructions stored on a memory of a device, such as a remote server or a user device, may be executed to generate second metadata indicative of the second theme. For example, the content processing engine and/or one or more content scanning modules at a remote server may generate a data tag, data label, or other metadata that is associated with the respective segment. For example, the metadata for a segment with two people kissing each other on the beach during sunset may be associated with metadata indicative of labels such as love, romance, couple, intimacy, attachment, sea, ocean, beach, sunset, etc.

At block 280 of the process flow 200, computer-executable instructions stored on a memory of a device, such as a remote server or a user device, may be executed to determine that user preference data associated with an active user profile comprises the first theme and the second theme. For example, the content processing engine and/or one or more content scanning modules at a remote server may determine an active user profile and/or user preference data associated with the active user profile or user account. The user preference data may include indications of the types of content that the user has historically consumed. The themes of the consumed content may be determined and used to determine or generate predictions of the types of content and/or themes of content the user may find interesting. The remote server may determine that the user preference data indicates that the user likes to consume content that has romance and action themes. In the example of FIG. 2, the segment may be determined to have a first theme of romance and a second theme of action, as determined using the video, text, and/or audio analysis of the content.

At block 290 of the process flow 200, computer-executable instructions stored on a memory of a device, such as a remote server or a user device, may be executed to generate, using the first metadata and the second metadata, a video summary comprising a portion of the first segment of the digital content. For example, the content processing engine and/or one or more content scanning modules at a remote server may determine that the user preference data indicates the user like content of romance and action themes. The remote server may determine whether there are segments of the digital content that include the themes indicated in the user preference data using the metadata, which may be data tags. In this example, the remote server may determine that the first segment has a portion that is associated with metadata indicating a romance theme and a portion that is associated with metadata indicating an action theme. The portion may be the same or may be different, and may therefore have the same or different timestamps. The remote server may generate a video summary that includes one or more portions, one of which may be an entire portion, of the first segment. The video summary may be presented at a display device. The video summary may therefore be customized for the user.

Figure 3:
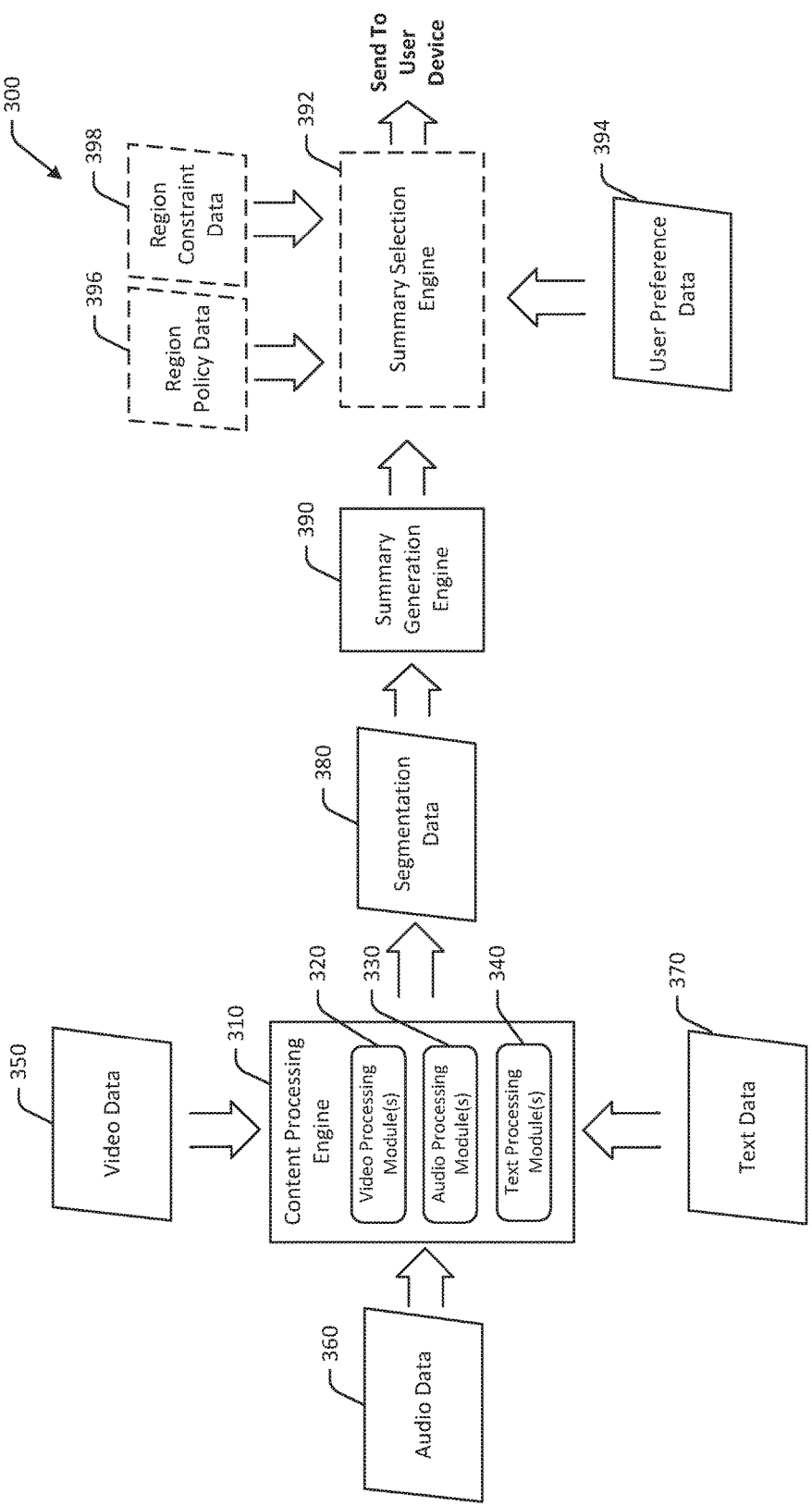
FIG. 3 is a schematic illustration of an example data flow for generating content summaries in accordance with one or more example embodiments of the disclosure.

FIG. 3 is a schematic illustration of an example data flow 300 for generating content summaries in accordance with one or more example embodiments of the disclosure. Different embodiments may include different, additional, or fewer inputs or outputs than those illustrated in the example of FIG. 3.

In FIG. 3, an example data flow 300 is schematically depicted. A content processing engine 310 and/or one or more content scanning module(s) may be configured to detect or determine one or more features present in digital content, such as audio, video, and/or text content. The content processing engine 310 may be stored at and/or executed by one or more remote servers. The content processing engine 310 may include one or more modules or algorithms, and may be configured to identify or determine the presence of one or more features in digital content.

For example, the content processing engine 310 may include one or more video processing modules 320, one or more audio processing modules 330, and/or one or more text processing modules 340. Additional or fewer, or different, modules may be included. The video processing module(s) 320 may be configured to process and/or analyze video content. For example, the video processing module(s) 320 may be configured to determine frames or sets of frames of video content and may be configured to detect certain features, such as certain objects or certain types of scenes, which may include action, violence, romance, drama, and the like. For example, a video file for a movie may include a first frame, a second frame, and so forth. The video processing module(s) 320 may be configured to detect or analyze frames in video content to determine which frames correspond to the same scene. For example, the video processing module(s) 320 may include facial recognition and/or human pose detection algorithms that can be used to identify people or themes in certain locations over frames or segments of the video content, which may not always be consecutive. For example, a scene may be briefly interrupted by a flashback or cut to a different story, and may resume thereafter. Video processing module(s) 320 may include one or more object recognition algorithms configured to detect at least one of predefined objects, predefined scenery (e.g., certain locations, etc.), and the like.

The audio processing module(s) 330 may be configured to process and/or analyze audio content, such as audible dialog, sound effects, music, and other audio. In some instances, the audio processing module(s) 330 may be configured to convert audio to text and/or perform natural language processing to determine a meaning of certain portions of audio or its corresponding transcription. The audio processing module(s) 330 may be configured to detect features such as violence (e.g., gunshots, explosions, etc.), romance, dialogue (e.g., presence of certain words or phrases, etc.), sentiment, tone, and/or other features. Audio processing module(s) 330 may include one or more algorithms configured to detect at least one of predefined expressions, predefined sounds, and the like.

The text processing module(s) 340 may be configured to analyze and/or process text content, such as text received from an audio-to-text transcription provided by the audio processing module(s) 330, subtitles associated with content, content summaries or synopses, chapter or section titles or descriptions, and/or other data or metadata associated with content.

The text processing module(s) 340 may include one or more natural language processing modules or algorithms and may be configured to detect or determine the presence of features such as certain words or phrases, themes, sentiment, topics, and/or other features. The text processing module(s) 340 may be configured to perform semantic role labeling, semantic parsing, or other processes configured to assign labels to words or phrases in a sentence that indicate the respective word or phrase's semantic role in a sentence, such as object, result, subject, goal, etc. Semantic role labeling may be a machine learning or artificial intelligence based process. Text processing module(s) 340 may include one or more algorithms configured to detect a meaning of text-based sentences.

The content processing engine 310 may receive one or more inputs for content for which a customized content summary, such as a video trailer, is to be generated. For example, the content processing engine 310 may receive one or more of video data 350 associated with content for which a customized content summary is to be generated, audio data 360 associated with content for which a customized content summary is to be generated, and/or text data 370 associated with content for which a customized content summary is to be generated. In some embodiments, the video data 350, audio data 360, and/or text data 370 may be extracted from a content file.

The content processing engine 310 may process the respective data associated with the content for which a customized content summary is to be generated. For example, the video data 350 may be processed using one or more of the video processing module(s) 320, the audio processing module(s) 330, and/or the text processing module(s) 340. Likewise, the audio data 360 and/or the text data 370 may be processed using one or more of the modules or algorithms of the content processing engine 310.

Using one or more algorithms or modules, the content processing engine 310 may determine the presence of one or more types of themes and/or scenes in the content, and may output detected segmentation data 380. The detected segmentation data 380 may indicate the respective content segments detected in the content. For example, there may be 12 different segments in the content, as determined by analysis of one or more of the video data 350, the audio data 360, and/or the text data 370. The segmentation data 380 may include respective indications of the 12 different segments. For example, segments may be identified using timestamps (e.g., start and end timestamps (of which there may be multiple sets, since segments may not be consecutive), etc.), location identifiers, actor identifiers, and/or other identifiers.

The detected segmentation data 380 may be input at a summary generation engine 390 and/or one or more summary/trailer generation module(s). The summary generation engine 390 may be configured to generate one or more content summaries using the segmentation data 380. For example, the summary generation engine 390 may generate a first content summary that may be an action-themed content summary using action-themed segments of the content. Action-themed segments may be segments that include certain types of objects (e.g., cars, guns, etc.), certain types of sounds (e.g., explosions, gunshots, etc.), certain types of human poses (e.g., fighting, etc.), and/or other types of indicators of action themes.

In some embodiments, the summary generation engine 390 may determine a specific portion of a segment to include in a content summary, rather than including the entire segment. For example, only a portion of a car chase segment that includes a car crash may be selected for inclusion in the content summary for an action-themed content summary. Accordingly, a highlight portion or most important portion of a segment may be included in the content summary, while the remainder of the segment may not be included. In some embodiments, the entire segment may be included in the content summary. In some instances, a combination of segment portions that are less than the entire segment may be included for some segments, and entire segment portions may be included for other segments.

The selected segment portions (which may include some entire segment portions) may be stitched together by the summary generation engine 390 to form the content summary. In some embodiments, the segment portions may be blended together at beginnings or ends using one or more transitions.

Different themed or types of content summaries generated by the summary generation engine 390 may include different segments and/or portions of segments of the content and may be of different lengths. In some embodiments, the summary generation engine 390 may be configured to modify content summaries based at least in part on user preferences. For example, if a user prefers short content summaries as well as romance-themed content (as determined using user preference data associated with a user account), such as movie trailers, the summary generation engine 390 may be configured to select and/or generate a romance-themed content summary, and may add or reduce content to generate a content summary that is relatively short, in accordance with the user preference. In addition, the summary generation engine 390 may select segments based at least in part on user summaries. For example, if the user preferences indicate that the user enjoys watching war action scenes, gunshot or war-themed segments may be selected for inclusion in the content summary for the particular user, as opposed to, for example, car chase action scenes. Accordingly, the summary generation engine 390 may be configured to generate custom content summaries and/or content summaries of customizable length.

The summary generation engine 390 may select certain music or sound for the respective generated content summaries. In some embodiments, the music or sound selected for a content summary may be selected from a set of music associated with content, such as a soundtrack for a movie. The music selected for the content summary may be played at a background volume, such that dialog may still be audible in some instances. In other embodiments, the music may be played instead of the content audio. The music or audio may be selected based at least in part on a theme of the content summary. For example, music having a relatively higher beats per minute may be selected for an action-themed content summary, as opposed to music having relatively less beats per minute that may be selected for a romance-themed content summary. Other factors, including genre of music, artist information, user music preferences, and/or other factors may be used to select music for certain content summaries. In some embodiments, music may be selected from a music library instead of a soundtrack or other music associated with content.

The summary generation engine 390 may be in communication with an optional summary selection engine 392. In some embodiments, the summary generation engine 390 may be configured to select and/or customize content summaries, while in other embodiments, the summary selection engine 392 may be configured to select and/or customize content summaries. The summary selection engine 392 and/or the summary generation engine 390 may be in communication with user preference data 394. The user preference data 394 may include information related to an active user profile or account, historically consumed content, historically viewed content and/or content summaries and resultant conversion information (e.g., whether the user viewed a content summary for content and then actually consumed the content, etc.), user content preference data, user content summary length preference data, and/or other preference data.

In some embodiments, the summary selection engine 392 and/or the summary generation engine 390 may optionally be in communication with region policy data 396 and/or region constraint data 398. Optional region policy data 396 may include data such as aggregate consumer preferences for content for users associated with a particular region. Regions may be geographic regions, and may be defined by country, zip code, continent, geographic territory, and/or by a different suitable metric. For example, the region policy data 396 may indicate that users from certain Asian countries prefer viewing content with red colors, such as red clothing, etc. In another example, users from North America may prefer viewing content with purple colors, or with certain types of themes, and so forth. The region policy data 396 may therefore be used during selection and/or ranking of segments to determine relevance to a particular region, or the region that a particular user is associated with. Optional region constraint data 398 may include specific rules or other data indicative of themes, colors, scenes, and/or other information indicative of content that is disliked generally in a certain region. For example, while certain regions may be relatively more open to viewing gun violence, other regions may dislike such content. The region constraint data 398 may therefore include data related to certain regions and content that may be disliked by users associated with the region. Accordingly, certain embodiments may determine region policy data associated with a region for which the video summary is to be generated, determine region constraint data associated with the region, and may determine that a certain segment of content is more relevant than the second segment using at least the user preference data, the region policy data, and/or the region constraint data.

The summary selection engine 392 and/or the summary generation engine 390 may query the user preference data 394 to determine user preference data for an active user profile. In some embodiments, the summary selection engine 392 and/or the summary generation engine 390 may determine an active user profile and may automatically request user preference data for the user profile. Based at least in part on the user preference data 394 for the particular user, the summary selection engine 392 and/or the summary generation engine 390 may determine a content summary and/or generate a customized content summary for the user. The output of the summary selection engine 392 and/or the summary generation engine 390 may be a customized content summary that may increase a likelihood that the user will be interested in the content and/or a conversion rate for the content. The summary selection engine 392 and/or the summary generation engine 390 may send the content summary to a user device for presentation at a display to the user. In some embodiments, the summary selection engine 392 and/or the summary generation engine 390 may send a link or other indicator of the content summary to the user device, and the user device may retrieve the content summary for presentation at a display associated with the user device. For example, a streaming device associated with a television may be receive the content summary and/or an indicator associated with the content summary, and may cause presentation of the content summary at the television. Presentation of the content summary may be inline at a user interface already rendered at a display, as opposed to generating another user interface in some instances, while in other instances, content summaries may be presented at a different or redirected user interface.

Metrics associated with the content summary, such as how much of the content summary the user consumed, an indication of whether or not the user decided to consume the content or not, and other metrics may be tracked by the content streaming device or other user device, and may be sent to the summary selection engine 392 and/or the summary generation engine 390 for making one or more changes to subsequent content summaries generated for users. For example, a remote server may determine a length of a video or content summary that was actually presented, where the length is less than an entire length of the video summary. The user may therefore not have consumed the entire content summary. The remote server may determine that the content associated with the content summary was nonetheless selected for consumption, and may subsequently determine a second video summary that has the length. Accordingly, content summary lengths may be adjusted based at least in part on an amount of the respective summary that users actually consume. In doing so, less important segments may be dropped from the content summary to reduce the length. Content summary lengths may also be increased in some instances, such as if the content summary is generally consumed in completion by users, which may indicate that users desire more content in the content summary. In such a manner, content summary content and length may be optimized at least with respect to conversion rate and/or user experience.

Figure 4:
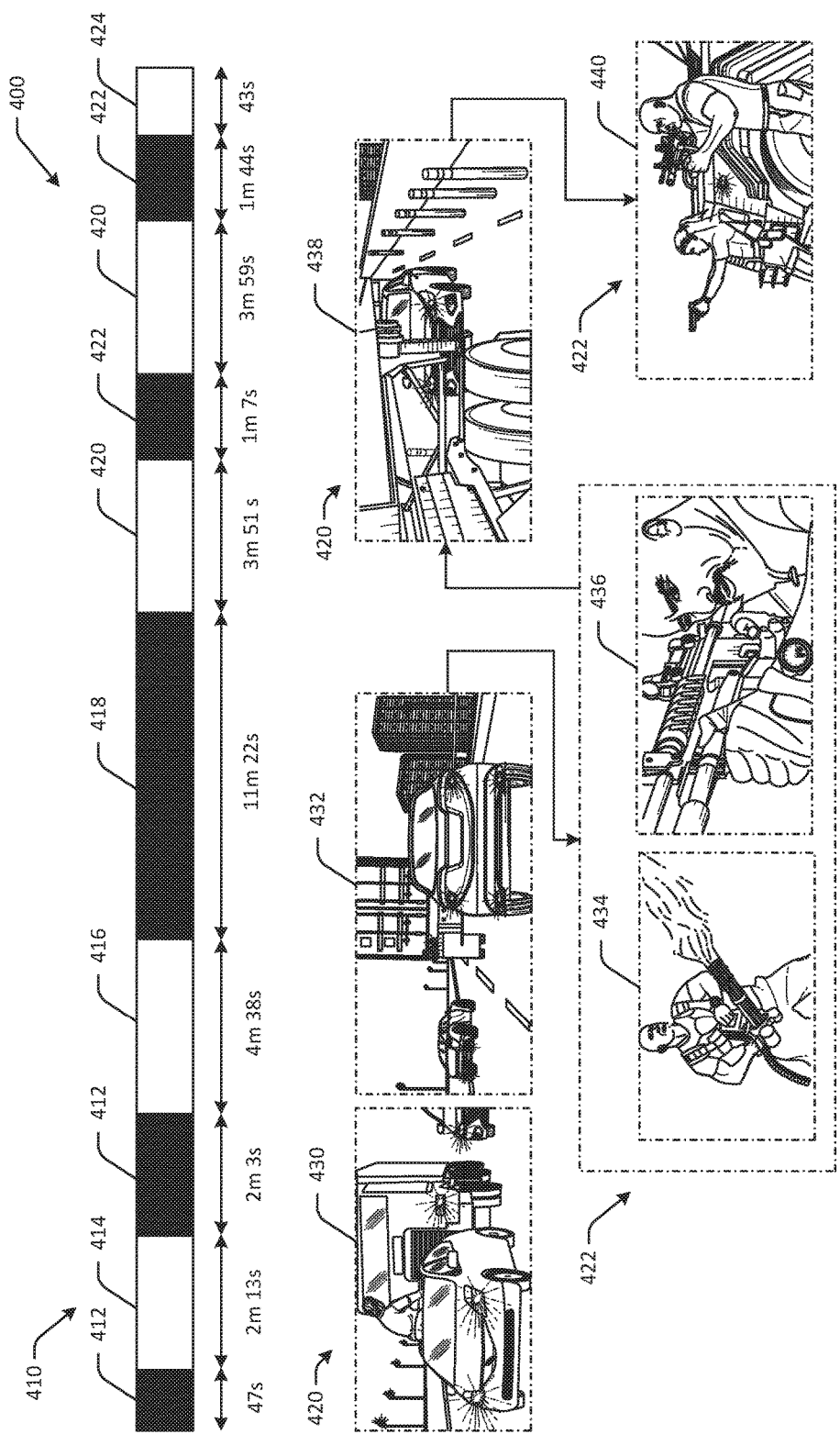
FIG. 4 is a schematic illustration of example segment identification in digital content and scene detection in accordance with one or more example embodiments of the disclosure.

FIG. 4 is a schematic illustration of example use case 400 of segment identification in digital content and scene detection in accordance with one or more example embodiments of the disclosure. In FIG. 4, content 410 is represented in a bar format and may include a number of different segments. The content may be video content, such as a movie, television show, or other video content. Segments may correspond to certain scenes of the content 410 and may or may not be continuous, and may have different lengths. Segments may be identified using one or more timestamps. The segments of content 410 are illustrated in alternating black and white blocks for illustrative purposes only.

For example, the content 410 may include a first segment 412 having a length of 47 seconds and a subsequent length of 2 minutes 3 seconds. The first segment 412 may be interrupted or separated by a second segment 414 having a length of 2 minutes 13 seconds. The first segment 412 may therefore be associated with a first start timestamp of 0:00 and a first end timestamp of 0:47, as well as a second start timestamp of 3:00 and a second end timestamp of 5:03. The second segment 414 may be associated with a start timestamp of 0:47 and an end timestamp of 2:59 or 3:00.

A third segment 416 may follow the second segment 412 and may have a length of 4 minutes 38 seconds. A fourth segment 418 may follow the third segment 416 and may have a length of 11 minutes 22 seconds. A fifth segment 420 may follow the fourth segment 418 and may have a first length of 3 minutes 51 seconds and a second length of 3 minutes 59 seconds. The fifth segment 420 may be separated by a first sub-segment of a sixth segment 422 having a length of 1 minute 7 seconds. The sixth segment 422 may have a second sub-segment of a length of 1 minute 44 seconds that follows the second sub-segment of the fifth segment 420. A seventh segment 424 may follow the second sub-segment of the sixth segment 422, and so forth. Some or all of the respective segments and/or sub-segments may be associated with respective timestamps.

FIG. 4 illustrates an example of a segment of the content 410 that has more than one sub-segment. For example, the fifth segment 420 may have a first sub-segment and a second sub-segment that is separated by a first sub-segment of the sixth segment 422. As illustrated in FIG. 4, the fifth segment 420 may include a first frame 430 and a second frame 432. The first frame 430 may include a car that may be identified using an object recognition algorithm, and the second frame 432 may include a car chasing another car, which may be determined using an action detection engine that may compare and/or analyze frames. The first frame 430 and the second frame 432 may therefore be associated with metadata indicating an action scene or action theme, car chase scene, car object present, and so forth.

The sixth segment 422 may include a first frame 434 and a second frame 436. The first frame 434 and the second frame 436 may include an action scene with a firearm, as identified using object recognition algorithms. The respective frames may be associated with corresponding metadata, which may include additional data, such as the type of camera angle (e.g., far shot for first frame 434 and close-up shot for the second frame 436, etc.). The first frame 434 and the second frame 436 of the sixth segment 422 may be after the second frame 432 of the fifth segment 420. The content 410 may then return to the fifth segment 420, which may include a third frame 438 that continues the car chase scene. The content 410 may then return to the sixth segment 422, which may include a third frame 440 that continues the gunfight scene. In the example of FIG. 4, the fifth segment 420 and the sixth segment 422 may be identified as different segments because, for example, they may be occurring at different locations and may be unrelated. However, if the gunfight scene involved the car chase, such as if the actors were shooting at the cars, the segment may have been identified as a single segment.

Timestamps may be determined for segments and/or events that occur in the content 410. For example, a first timestamp may be associated with a start of the first event, and a second timestamp may be associated with an end of the first event. Timestamps may be used to generate video summaries. For example, a video summary may include segments or portions of segments as identified using respective start and end timestamps.

The remote server may therefore, in one example, determine a first timestamp at which the car chase scene begins, a second timestamp at which a cut scene begins (e.g., the sixth segment 422) during the car chase scene, a third timestamp at which the cut scene ends (e.g., end of the first sub-segment of the sixth segment 422), a fourth timestamp at which the car chase scene ends (e.g., end of the second sub-segment of the fifth segment 420), and so forth. If the car chase scene were to be included in the content summary, and the fifth segment 420 included portions that did not have much action (e.g., people talking inside a car, etc.) and the user preferences indicated action-themed content is desired, the non-action portions of the segment may not be included in the video summary.

To identify segments, the remote server may extract video, audio, and/or text files from a content file. For example, the remote server may extract a first set of video frames that correspond to the content and/or a segment of the content (if the segment has been identified). The extracted video frames may be processed. For example, the remote server may determine, using one or more image recognition algorithms, that the first set of video frames, which may correspond to the fifth segment 420, include a car chase scene. In some instances, a remote server or a user device may be used to analyze one or more portions of video of a content file to determine whether instances of any predefined objects are present. Predefined objects may be certain objects such as firearms, explosions, needles, drugs, and so forth. Objects may be determined to be present based at least in part on object detection, or other audio, text, image, or video processing algorithms. In some embodiments, individual frames or sets of frames, or portions of text data or audio data, may be analyzed to determine whether any predefined objects are present.

The remote server may extract first audio data that corresponds to the content and/or a segment of the content from the content data, and may determine, using one or more sound processing algorithms, that the first audio data includes gun shot sounds. The remote server may determine, based at least in part on the car chase scene and the gun shot sounds, that the first clip or first segment is an action clip or an action segment. The remote server may determine a second clip or a second segment of the content, and may determine, for example, that the second clip is a romance clip. The segments may be sorted by theme. If the preferred content theme for a user as indicated by user preference data is action, the remote server may determine, using the preferred content theme, that the first segment with the car chase scene is ranked higher than the second segment. However, if the remote server determines that a length of the first segment is longer than a trailer length threshold (e.g., a trailer or content summary may be limited to a maximum time length, for example 3 minutes, etc.), the remote server may determine a portion of the first segment to use for a trailer for the movie, and may send the portion of the first segment to present as the movie trailer at a display device. Accordingly, some embodiments may select portions of a segment or sub-segment to include in a content summary or movie trailer.

One or more scores may be generated for the determined segments. Scores may vary based at least in part on user preferences. For example, scores of a romantic segment of content may be relatively higher for a user that likes romance themes than for a user than likes action themes. In some instances, scores may not be impacted by user preferences and may be used to determine importance or relevance of a segment to the content as a whole. Scores may include, in one example, visual content scores or video scores. For example, the remote server may determine a first visual content score for a first event that occurs during a segment, where the first visual content score is indicative of an importance of the first event. The visual content scores may be used to determine which portions of a segment may be important and/or which segments of content may be important.

Figure 5:
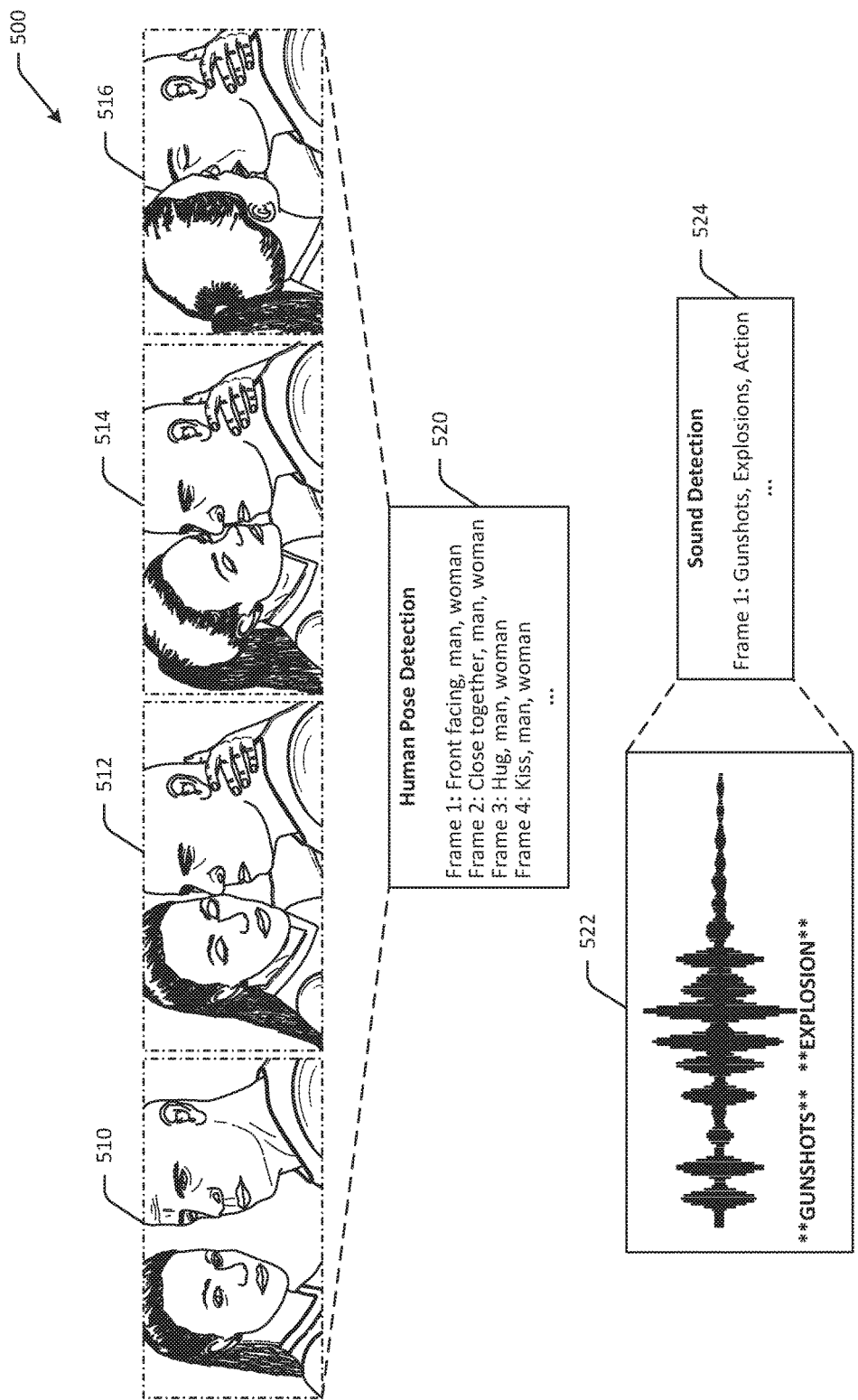
FIG. 5 is a schematic illustration of example human pose and sound detection in digital content in accordance with one or more example embodiments of the disclosure.

FIG. 5 is a schematic illustration of an example use case 500 for human pose and audio detection in digital content in accordance with one or more example embodiments of the disclosure. While example embodiments of the disclosure may be described in the context of frames or images, it should be appreciated that the disclosure is more broadly applicable to any suitable portion of digital content.

Certain embodiments may use one or more human pose detection algorithms to process video frames and determine human actions that may occur during the frame or set of frames. For example, in FIG. 5, a set of frames may be from the content 410 of FIG. 4 and may include a first frame 510, a second frame 512, a third frame 514, and a fourth frame 516. One or more content processing engines and/or one or more content scanning modules at a remote server may be configured to process the respective frames using image recognition algorithms to determine human actions that occur during the frames. For example, the algorithms may be configured to extract actions and/or poses at certain frame intervals of content, such as frames at every 5 seconds of content. In the first frame 510, output 520 of the algorithm may indicate that a man and a woman are facing forward and looking away from each other. In the second frame 512, the output may indicate that the man and the woman are closer to each other and the woman has placed her hand on the neck of the man. In the third frame 514, the output may indicate that the man and the woman are hugging and almost kissing, and in the fourth frame 516, the output may indicate that the man and the woman are kissing.

The output of the frame or the set of frames may be used to generate metadata for the segment from which the frames were extracted and/or the segment the frames are otherwise associated with. For example, as illustrated in FIG. 5, the output 520 illustrates data tags another format of metadata that may be associated with one or more of the frames and/or related segment of content. The output 520 may also be used to determine a theme of the frames and/or related segment. For instances, the example of FIG. 5 may be a romance-themed segment.

Human pose detection may include object detection, pattern recognition (e.g., human action image recognition, etc.), facial recognition (e.g., facial sentiment detection, etc.), or other image or video processing algorithms. In some embodiments, individual frames or sets of frames may be analyzed to determine whether human action is present.

Audio detection may be used to determine dialog that occurs in a segment, actions or events that may occur during the segment, a tempo or pace of the segment, and/or the like. For example, a remote server or a user device may be used to analyze one or more portions of audio of a content file to determine whether instances of any predefined sounds, verbs, keywords, or other features are present. Predefined sounds may be certain objects such as firearms, explosions, moans, and so forth. Sounds may be determined to be present based at least in part on audio detection, voice processing, or other audio, text, image, or video processing algorithms. In some embodiments, individual portions of audio data may be analyzed to determine whether any predefined sounds are present. In the example of FIG. 5, a segment of audio 522 may be associated with a segment of content, and may include gunshots and explosions, as indicated by an output 524 of one or more audio processing algorithms. The audio processing algorithm may be configured to detect dialog, predefined sounds, and other audio-based features present in the audio. Audio processing may also be used to determine the occurrence of events, and/or to corroborate the occurrence of events. For example, cheering may be associated with a winning home run or basketball goal. In some embodiments, a remote server may determine, using one or more audio processing algorithms, an event that occurs in audio content, and may determine a theme of the corresponding scene or segment using the event.

Scores may be generated using audio and/or text. For example, a remote server may determine a first audible score for a first sentence of dialog that may be indicative of an importance of the first sentence. To determine the score, the remote server may determining a meaning of the sentence. Audio or audible scores may be used in addition to or instead of, or in combination with, video or visual content scores to rank segments and/or portions of segments.

Figure 6:
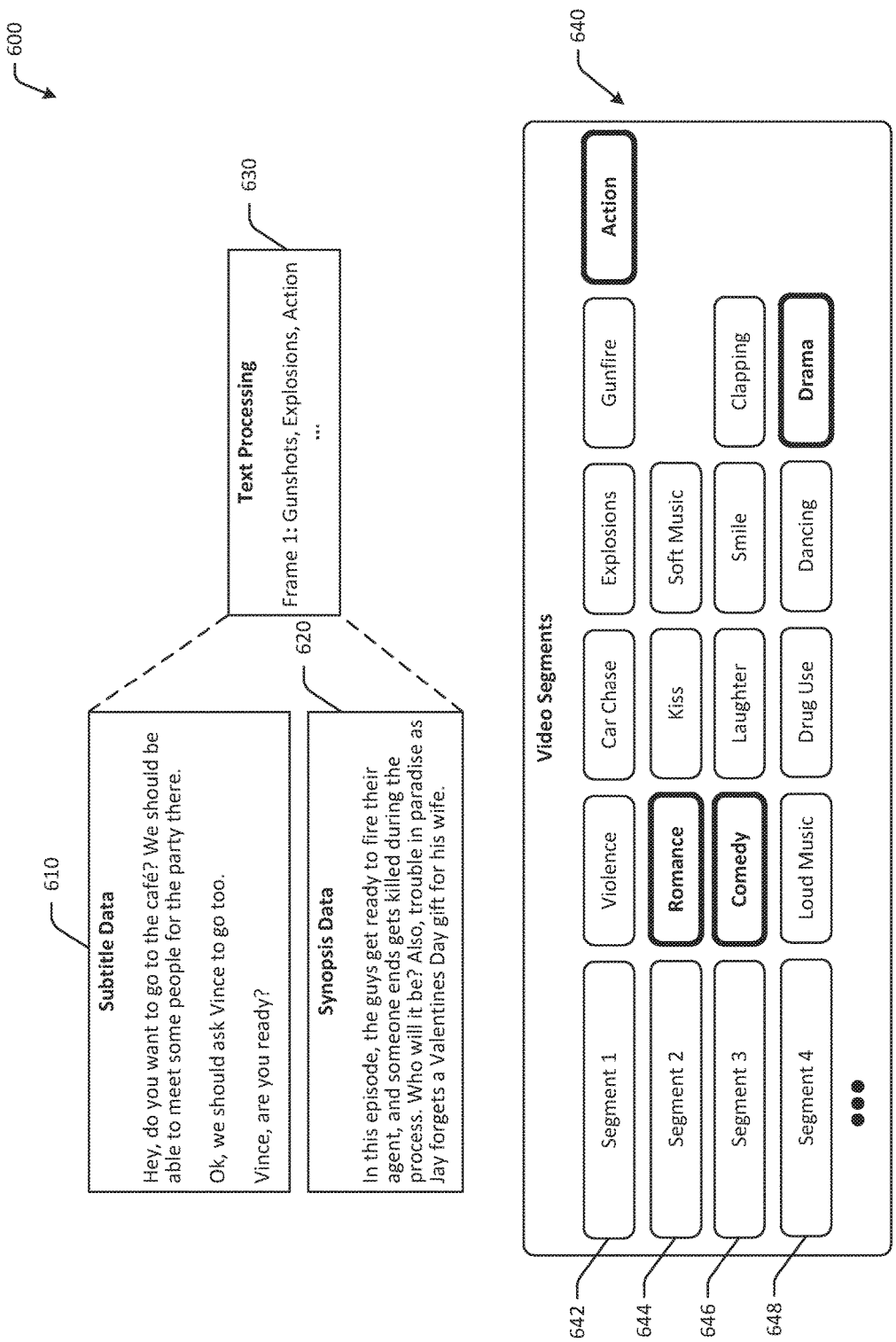
FIG. 6 is a schematic illustration of an example text processing analysis and segment categorization in accordance with one or more example embodiments of the disclosure.

FIG. 6 is a schematic illustration of an example use case 600 of text processing analysis and segment categorization in accordance with one or more example embodiments of the disclosure. In FIG. 6, text data associated with content may be used to determine themes of, and/or events or actions that occur during, segments or content. For example, a remote server or a user device may be used to analyze one or more portions of text of a content file to determine whether instances of predefined expressions or dialog are present. Predefined expressions or dialog may be certain expressions such as words or phrases, meanings, and so forth. Expressions may be determined to be present based at least in part on word identification (e.g., word recognition model, etc.), natural language processing, semantic role labeling, or other text, image, or video processing algorithms. In some embodiments, individual portions of text data may be analyzed to determine whether any predefined expressions are present.

For example, subtitle data 610 may be used to determine dialog that occurs between actors in a segment of content. The subtitle data 610 may be used in conjunction with synopsis data 620. In some instances, one or the other, of a different type of text data may be used. Output 630 of analysis algorithms of the text data may indicate that in a certain frame and/or segment of content, gunshots, explosions, and action are metadata tags that are to be associated with the respective segment. While example embodiments of the disclosure may be described in the context of subtitles, it should be appreciated that the disclosure is more broadly applicable to any suitable portion of text content or related metadata, such as summaries or synopses content.

In an example, a remote server may extract subtitle data that corresponds to a segment of content. The remote server may determine that a first sentence of the subtitle data has a keyword, such as "kill." The keyword may be one of a set of keywords, and may represent a key character action. In some embodiments, a first conversation score may be determined for the first sentence using the keyword. The first conversation score may be greater or higher than a second conversation score for a second sentence of the subtitle data that does not include keywords of the set of keywords. The first sentence may be determined to be more important than the second sentence as a result of having a higher conversation score. The conversation score may be the audible score or may be incorporated into the audible score.

The segments of content may be categorized and/or grouped together based at least in part on a theme or type of segment. For example, categorized segments 640 may include a first segment identifier for a first segment 642 that is associated with various metadata and a theme of action-themed (as indicated by the bold box for illustration), a second segment identifier for a second segment 644 that is associated with various metadata and a theme of romance-themed, a third segment identifier for a third segment 646 that is associated with various metadata and a theme of comedy-themed, a fourth segment identifier for a fourth segment 648 that is associated with various metadata and a theme of drama-themed, and so forth. Some content may not have different types of themes. Other content segments that have the same themes may be clustered together in groups. As illustrated in FIG. 6, the respective segments may be associated with tags that describe features that occur in the respective segments.

Figure 7:
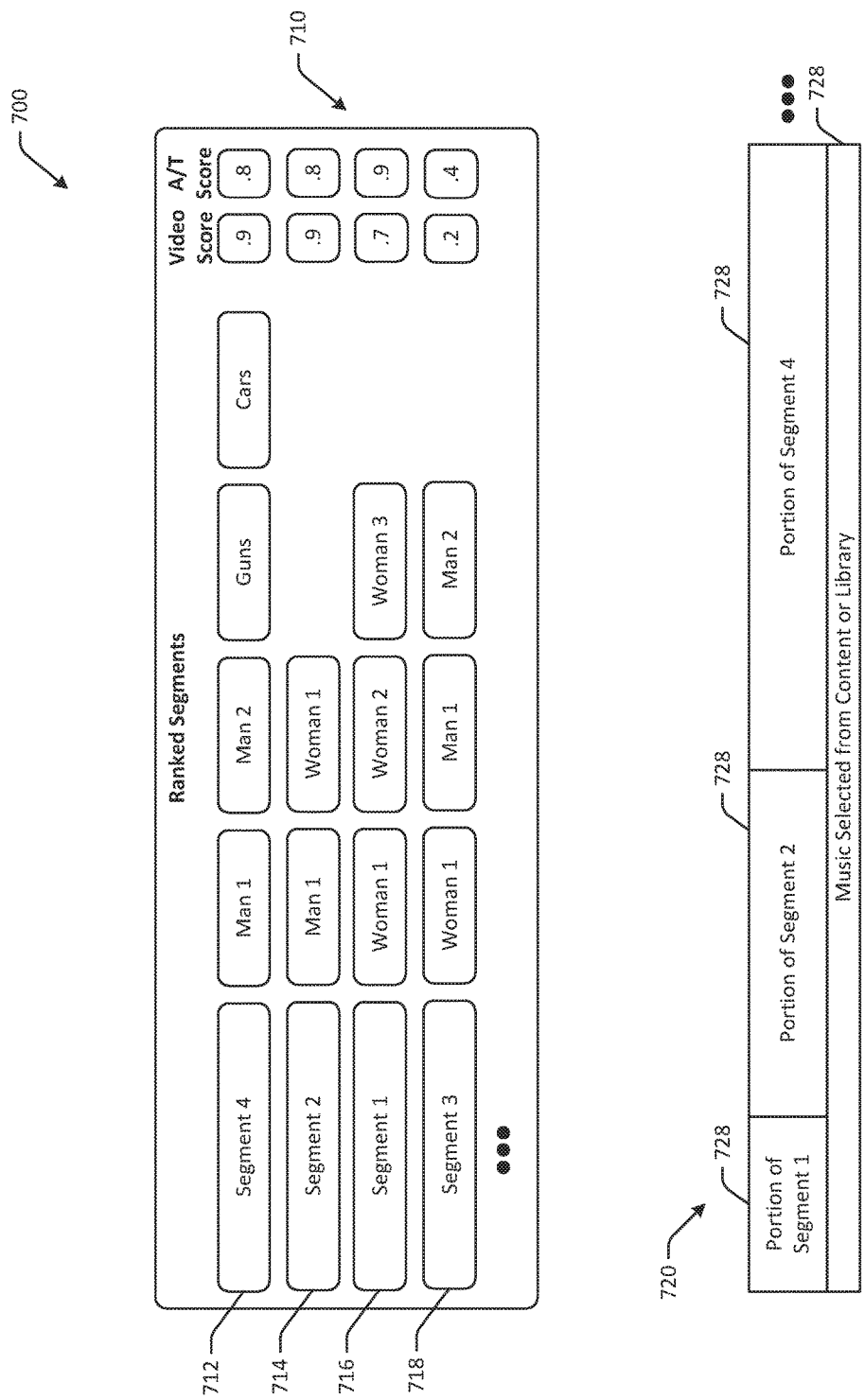
FIG. 7 is a schematic illustration of an example of ranked segments and segment selection for content summaries in accordance with one or more example embodiments of the disclosure.

FIG. 7 is a schematic illustration of an example use case 700 of ranked segments 710 and segment selection for content summaries in accordance with one or more example embodiments of the disclosure.

Content segments may be associated with visual and/or audio/text scores. Segments may be ranked using one or more scores, and the ranking may be used to determine which segments or portions of segments to include in a content summary. For example, a first ranked segment 712 may be Segment 4 and may be associated with metadata indicating human pose detection and object detection results, and may be associated with a video score of 0.9 and an audio/text score of 0.8. The respective scores may be any suitable alphanumeric value and may be of any format or range. A second ranked segment 712 may be Segment 2 and may be associated with metadata indicating human pose detection and object detection results, and may be associated with a video score of 0.9 and an audio/text score of 0.8. A third ranked segment 716 may be Segment 1 and may be associated with metadata indicating human pose detection and object detection results, and may be associated with a video score of 0.7 and an audio/text score of 0.9. A fourth ranked segment 718 may be Segment 3 and may be associated with metadata indicating human pose detection and object detection results, and may be associated with a video score of 0.2 and an audio/text score of 0.4. For example, a remote server may determine that the fourth segment is more relevant or more important than the second segment using the respective metadata, and optionally user preference data for a user that a content summary is being generated for.

The video scores and audio/text scores may be representative of the importance of the segments, and may be determined by the substance of the content that occurs in the respective segment. The segments may be ranked using one or both, or a combination, of the scores. For example, a remote server may determine a first aggregate visual content score for the fourth segment, which may be a combination of the visual content scores for frames associated with the fourth segment. The combination may be a total sum, an average, a median, or another combination. The remote server may determine a first aggregate audible score for the fourth segment, which may be a combination of the visual content scores for frames associated with the fourth segment. The process may be repeated until scores have been generated for some or all of the segments.

The segment ranking may be used to generate a customized content summary 720. For example, the content summary 720 may include a portion of Segment 1 728, a portion of Segment 2 728, a portion of Segment 4 728, and so forth. The portion of the respective segments may be less than or equal to the entire segment. For example, because Segment 4 was the top ranked segment, the content summary 720 may include a longer portion of Segment 4 than of Segment 1 or 2. The segments may be selected in chronological order and some segments may not be included in the content summary 720.

Background music 728 may optionally be selected and added to the content summary 720 for presentation. The background music 728 may be a theme song or other music associated with the content or selected from a library. In some embodiments, a remote server may determine a length of the content summary 720, and may determine a music composition associated with the content, such as a theme song or a sound from a soundtrack of the content. The remote server may determine a segment of the music composition having the length of the content summary 720 for inclusion in the content summary 720.

One or more operations of the methods, process flows, or use cases of FIGS. 1-7 may have been described above as being performed by a user device, or more specifically, by one or more program module(s), applications, or the like executing on a device. It should be appreciated, however, that any of the operations of the methods, process flows, or use cases of FIGS. 1-7 may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-7 may be described in the context of the illustrative devices, it should be appreciated that such operations may be implemented in connection with numerous other device configurations.

The operations described and depicted in the illustrative methods, process flows, and use cases of FIGS. 1-7 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/ or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 8:
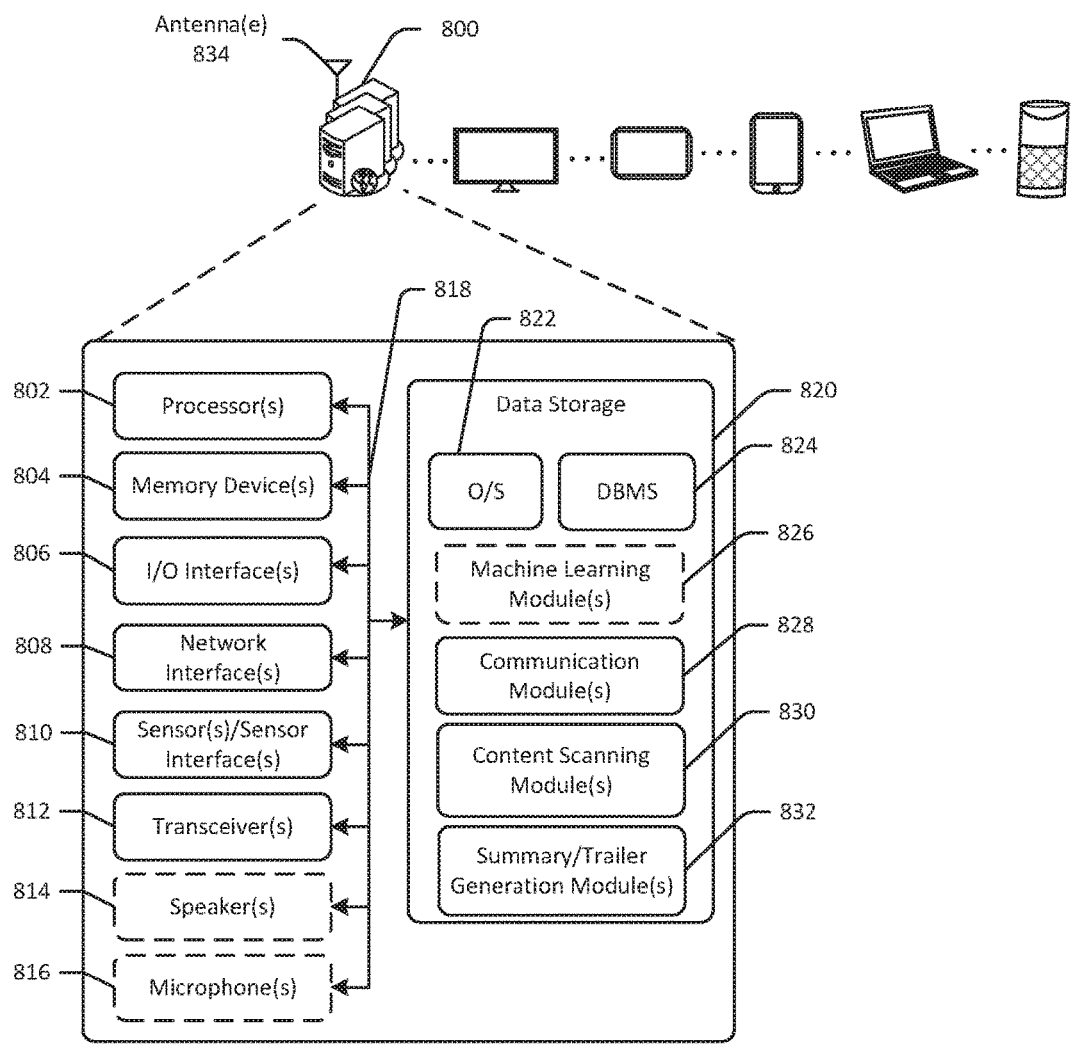
FIG. 8 is a schematic block diagram of an illustrative device in accordance with one or more example embodiments of the disclosure.

FIG. 8 is a schematic block diagram of an illustrative remote server 800 in accordance with one or more example embodiments of the disclosure. The remote server 800 may include any suitable computing device capable of receiving and/or sending data including, but not limited to, a mobile device such as a smartphone, tablet, e-reader, wearable device, or the like; a desktop computer; a laptop computer; a content streaming device; a set-top box; or the like. The remote server 800 may correspond to an illustrative device configuration for the devices of FIGS. 1-7.

The remote server 800 may be configured to communicate via one or more networks with one or more servers, search engines, user devices, or the like. In some embodiments, a single remote server or single group of remote servers may be configured to perform more than one type of content rating and/or machine learning functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the remote server 800 may include one or more processors (processor(s)) 802, one or more memory devices 804 (generically referred to herein as memory 804), one or more input/output (I/O) interface(s) 806, one or more network interface(s) 808, one or more sensors or sensor interface(s) 810, one or more transceivers 812, one or more optional speakers 814, one or more optional microphones 816, and data storage 820. The remote server 800 may further include one or more buses 818 that functionally couple various components of the remote server 800. The remote server 800 may further include one or more antenna(e) 834 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 818 may include at least one of a system bus, a memory bus, an address bus, or a message bus, and may permit exchange of information (e.g., data (including computer-executable code), signaling, etc.) between various components of the remote server 800. The bus(es) 818 may include, without limitation, a memory bus or a memory controller, a peripheral bus, an accelerated graphics port, and so forth. The bus(es) 818 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 804 of the remote server 800 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 804 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 804 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 820 may include removable storage and/or non-removable storage including, but not limited to, magnetic storage, optical disk storage, and/or tape storage. The data storage 820 may provide non-volatile storage of computer-executable instructions and other data. The memory 804 and the data storage 820, removable and/or non-removable, are examples of computer-readable storage media (CRSM) as that term is used herein.

The data storage 820 may store computer-executable code, instructions, or the like that may be loadable into the memory 804 and executable by the processor(s) 802 to cause the processor(s) 802 to perform or initiate various operations. The data storage 820 may additionally store data that may be copied to memory 804 for use by the processor(s) 802 during the execution of the computer-executable instructions. Moreover, output data generated as a result of execution of the computer-executable instructions by the processor(s) 802 may be stored initially in memory 804, and may ultimately be copied to data storage 820 for non-volatile storage.

More specifically, the data storage 820 may store one or more operating systems (O/S) 822; one or more database management systems (DBMS) 824; and one or more program module(s), applications, engines, computer-executable code, scripts, or the like such as, for example, one or more optional machine learning module(s) 826, one or more communication module(s) 828, one or more content scanning module(s) 830, and/or one or more summary/trailer generation module(s) 832. Some or all of these module(s) may be sub-module(s). Any of the components depicted as being stored in data storage 820 may include any combination of software, firmware, and/or hardware. The software and/or firmware may include computer-executable code, instructions, or the like that may be loaded into the memory 804 for execution by one or more of the processor(s) 802. Any of the components depicted as being stored in data storage 820 may support functionality described in reference to correspondingly named components earlier in this disclosure.

The data storage 820 may further store various types of data utilized by components of the remote server 800. Any data stored in the data storage 820 may be loaded into the memory 804 for use by the processor(s) 802 in executing computer-executable code. In addition, any data depicted as being stored in the data storage 820 may potentially be stored in one or more datastore(s) and may be accessed via the DBMS 824 and loaded in the memory 804 for use by the processor(s) 802 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 8, the datastore(s) may include, for example, user preference information, user action information, user profile information, historical content consumption information, and other information.

The processor(s) 802 may be configured to access the memory 804 and execute computer-executable instructions loaded therein. For example, the processor(s) 802 may be configured to execute computer-executable instructions of the various program module(s), applications, engines, or the like of the remote server 800 to cause or facilitate various operations to be performed in accordance with one or more embodiments of the disclosure. The processor(s) 802 may include any suitable processing unit capable of accepting data as input, processing the input data in accordance with stored computer-executable instructions, and generating output data. The processor(s) 802 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 802 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 802 may be capable of supporting any of a variety of instruction sets.

Referring now to functionality supported by the various program module(s) depicted in FIG. 8, the optional machine learning module(s) 826 may include computer-executable instructions, code, or the like that responsive to execution by one or more of the processor(s) 802 may perform functions including, but not limited to, determining conversion data, determining correlations between selected summaries and conversions, generating one or more machine learning models or algorithms, determining content ratings, determining frames of content, and the like.

The communication module(s) 828 may include computer-executable instructions, code, or the like that responsive to execution by one or more of the processor(s) 802 may perform functions including, but not limited to, communicating with one or more devices, for example, via wired or wireless communication, communicating with remote servers, communicating with remote datastores, sending or receiving notifications or commands/directives, communicating with cache memory data, communicating with user devices, and the like.

The content scanning module(s) 830 may include computer-executable instructions, code, or the like that responsive to execution by one or more of the processor(s) 802 may perform functions including, but not limited to, analyzing digital content, extracting frames, determining pixel color values determining audio content, determining or analyzing text and/or audio files, identifying certain portions of content, extracting segments of content, and the like.

The summary/trailer generation module(s) 832 may include computer-executable instructions, code, or the like that responsive to execution by one or more of the processor(s) 802 may perform functions including, but not limited to, selecting segments or portions of segments to include in a summary video file, selecting music or portions of music or other sounds to include in a summary video file, selecting a specific summary for a user based on user preferences, generating summaries, and the like.

Referring now to other illustrative components depicted as being stored in the data storage 820, the O/S 822 may be loaded from the data storage 820 into the memory 804 and may provide an interface between other application software executing on the remote server 800 and hardware resources of the remote server 800. More specifically, the O/S 822 may include a set of computer-executable instructions for managing hardware resources of the remote server 800 and for providing common services to other application programs (e.g., managing memory allocation among various application programs). In certain example embodiments, the O/S 822 may control execution of the other program module(s) to for content rendering. The O/S 822 may include any operating system now known or which may be developed in the future including, but not limited to, any server operating system, any mainframe operating system, or any other proprietary or non-proprietary operating system.

The DBMS 824 may be loaded into the memory 804 and may support functionality for accessing, retrieving, storing, and/or manipulating data stored in the memory 804 and/or data stored in the data storage 820. The DBMS 824 may use any of a variety of database models (e.g., relational model, object model, etc.) and may support any of a variety of query languages. The DBMS 824 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the remote server 800 is a mobile device, the DBMS 824 may be any suitable light-weight DBMS optimized for performance on a mobile device.

Referring now to other illustrative components of the remote server 800, the input/output (I/O) interface(s) 806 may facilitate the receipt of input information by the remote server 800 from one or more I/O devices as well as the output of information from the remote server 800 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the remote server 800 or may be separate. The I/O devices may further include, for example, any number of peripheral devices such as data storage devices, printing devices, and so forth.

The I/O interface(s) 806 may also include an interface for an external peripheral device connection such as universal serial bus (USB), FireWire, Thunderbolt, Ethernet port or other connection protocol that may connect to one or more networks. The I/O interface(s) 806 may also include a connection to one or more of the antenna(e) 834 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The remote server 800 may further include one or more network interface(s) 808 via which the remote server 800 may communicate with any of a variety of other systems, platforms, networks, devices, and so forth. The network interface(s) 808 may enable communication, for example, with one or more wireless routers, one or more host servers, one or more web servers, and the like via one or more of networks.

The antenna(e) 834 may include any suitable type of antenna depending, for example, on the communications protocols used to transmit or receive signals via the antenna (e) 834. Non-limiting examples of suitable antennas may include directional antennas, non-directional antennas, dipole antennas, folded dipole antennas, patch antennas, multiple-input multiple-output (MIMO) antennas, or the like. The antenna(e) 834 may be communicatively coupled to one or more transceivers 812 or radio components to which or from which signals may be transmitted or received.

As previously described, the antenna(e) 834 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 834 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 834 may be configured to transmit or receive radio frequency signals within any suitable frequency range forming part of the unlicensed portion of the radio spectrum.

The antenna(e) 834 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 812 may include any suitable radio component(s) for—in cooperation with the antenna(e) 834—transmitting or receiving radio frequency (RF) signals in the bandwidth and/or channels corresponding to the communications protocols utilized by the remote server 800 to communicate with other devices. The transceiver(s) 812 may include hardware, software, and/or firmware for modulating, transmitting, or receiving—potentially in cooperation with any of antenna(e) 834—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 812 may further include hardware, firmware, or software for receiving GNSS signals. The transceiver(s) 812 may include any known receiver and baseband suitable for communicating via the communications protocols utilized by the remote server 800. The transceiver(s) 812 may further include a low noise amplifier (LNA), additional signal amplifiers, an analog-to-digital (A/D) converter, one or more buffers, a digital baseband, or the like.

The sensor(s)/sensor interface(s) 810 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 814 may be any device configured to generate audible sound. The optional microphone(s) 816 may be any device configured to receive analog sound input or voice data.

It should be appreciated that the program module(s), applications, computer-executable instructions, code, or the like depicted in FIG. 8 as being stored in the data storage 820 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the remote server 800, and/or hosted on other computing device(s) accessible via one or more networks, may be provided to support functionality provided by the program module(s), applications, or computer-executable code depicted in FIG. 8 and/or additional or alternate functionality. Further, functionality may be modularized differently such that processing described as being supported collectively by the collection of program module(s) depicted in FIG. 8 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 8 may be implemented, at least partially, in hardware and/or firmware across any number of devices.

It should further be appreciated that the remote server 800 may include alternate and/or additional hardware, software, or firmware components beyond those described or depicted without departing from the scope of the disclosure. More particularly, it should be appreciated that software, firmware, or hardware components depicted as forming part of the remote server 800 are merely illustrative and that some components may not be present or additional components may be provided in various embodiments. While various illustrative program module(s) have been depicted and described as software module(s) stored in data storage 820, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
   determining, by one or more computer processors coupled to memory, that a tile for a movie is selected at a first user interface on a display;
   determining an active user profile, wherein the active user profile is associated with movies that were previously selected for consumption;
   determining that a preferred content theme associated with the active user profile is an action content theme, wherein the preferred content theme represents a majority of themes of the movies previously selected for consumption;
   determining a first clip of the movie using content data associated with the movie, wherein the first clip is a continuous portion of the movie corresponding to a first scene of the movie that occurs from a first timestamp to a second timestamp;
   extracting a first set of video frames that corresponds to the first clip from the content data;
   determining, using an image recognition algorithm, that the first set of video frames comprises a car chase scene;
   extracting first audio data that corresponds to the first clip from the content data;
   determining, using a sound processing algorithm, that the first audio data comprises gun shot sounds;
   determining, based at least in part on the car chase scene and the gun shot sounds, that the first clip is an action clip;
   determining a second clip of the movie using the content data, wherein the second clip is a continuous portion of the movie corresponding to a second scene of the movie that occurs from a third timestamp to a fourth timestamp;
   determining that the second clip is a romance clip;
   determining, using the preferred content theme, that the first clip is ranked higher than the second clip;
   determining that a length of the first clip is longer than a trailer length threshold;
   determining a portion of the first clip to use for a trailer for the movie; and
   sending the portion of the first clip to present as the movie trailer at the first user interface on the display.

2. The method of claim 1, further comprising:
   extracting conversation data that corresponds to the first clip from the content data;
   determining that a first sentence of the conversation data comprises a keyword of a set of keywords, wherein the keyword represents a key character action;
   determining a first conversation score for the first sentence using the keyword;
   determining that a second sentence of the conversation data does not include keywords of the set of keywords;
   determining a second conversation score for the second sentence that is less than the first conversation score;
   determining, using the first conversation score and the second conversation score, that the first sentence is more important than the second sentence;
   determining a first visual content score for the car chase scene;
   determining a second visual content score for the second clip that is less than the first visual content score; and
   determining, using the first visual content score and the second visual content score, that the car chase scene is more important than the second clip.

3. The method of claim 1, further comprising:
   determining a fifth timestamp at which the car chase scene begins;
   determining a sixth timestamp at which a cut scene begins during the car chase scene;
   determining a seventh timestamp at which the cut scene ends during the car chase scene;
   determining an eighth timestamp at which the car chase scene ends;
   wherein determining the portion of the first clip to use for the trailer for the movie comprises determining the portion of the first clip from the fifth timestamp to the sixth timestamp and from the seventh timestamp to the eighth timestamp to use for the trailer for the movie.

4. The method of claim 1, further comprising:
   determining a theme song identifier associated with the movie;
   determining a length of the portion of the first clip; and
   determining a segment of the theme song to include with the portion of the first clip, wherein the segment is of the length of the portion;
   wherein sending the portion of the first clip to present as the movie trailer at the first user interface on the display comprises sending the portion of the first clip and the segment of the theme song to present as the movie trailer.

5. A method comprising:
   determining, by one or more computer processors coupled to memory, a first segment of digital content, the first segment comprising a first set of frames, first textual content, and first audio content;
   determining, using one or more object recognition algorithms, a first event that occurs in the first set of frames;
   determining a first theme of the first event;
   generating first metadata indicative of the first theme;
   determining, using one or more natural language processing algorithms, a meaning of a first sentence that occurs in the first textual content;
   determining a second theme of the first sentence;
   generating second metadata indicative of the second theme;
   determining that user preference data associated with an active user profile comprises the first theme and the second theme; and
   generating, using the first metadata and the second metadata, a video summary comprising a portion of the first segment of digital content.

6. The method of claim 5, wherein the video summary is a first video summary, the method further comprising:
   determining a length of the video summary was presented, wherein the length is less than an entire length of the video summary;
   determining that the digital content was selected for consumption; and
   determining a second video summary that has the length.

7. The method of claim 5, further comprising:
   determining a first visual content score for the first event indicative of an importance of the first event;
   determining a second event that occurs in the first set of frames;
   determining a second visual content score for the second event; and
   determining that the first visual content score is greater than the second visual content score.

8. The method of claim 7, further comprising:
   determining a first timestamp associated with a start of the first event; and
   determining a second timestamp associated with an end of the first event;
   wherein generating the video summary comprising the portion of the first segment of digital content comprises generating the video summary comprising the portion of the first segment of digital content from the first timestamp to the second timestamp.

9. The method of claim 8, further comprising:
   determining a third timestamp at which a second event begins in the first set of frames, wherein the third timestamp is in between the first timestamp and the second timestamp; and
   determining a fourth timestamp at which the second event ends in the first set of frames, wherein the fourth timestamp is in between the third timestamp and the fourth timestamp;
   wherein generating the video summary comprising the portion of the first segment of digital content comprises generating the video summary comprising the portion of the first segment of digital content from the first timestamp to the third timestamp and from the fourth timestamp to the second timestamp.

10. The method of claim 5, further comprising:
    determining a length of the portion of the first segment;
    determining a music composition associated with the digital content; and
    determining a segment of the music composition having the length;
    wherein generating the video summary comprising the portion of the first segment of digital content comprises generating the video summary comprising the portion of the first segment of digital content and the segment of the music composition.

11. The method of claim 5, further comprising:
    determining, using one or more audio processing algorithms, a second event that occurs in the first audio content;
    determining that the second event corresponds to the first event; and
    determining that a theme of the second event is the first theme.

12. The method of claim 11, further comprising:
    determining a first audible score for the first sentence indicative of an importance of the first sentence;
    determining a meaning of a second sentence that occurs in the first textual content;
    determining a second audible score for the second sentence;
    determining a third audible score for the second event; and
    determining that the first audible score is greater than the second audible score and the third audible score.

13. The method of claim 5, further comprising:
    determining a first aggregate visual content score for the first segment;
    determining a first aggregate audible score for the first segment;
    determining a second segment of digital content comprising a second set of frames, second textual content, and second audio content;
    determining a second event that occurs in the second set of frames;
    generating third metadata indicative of a third theme of the second event;
    determining a second aggregate visual content score for the second segment;
    determining a second aggregate audible score for the second segment; and
    determining that the first segment is more important than the second segment using the first aggregate visual content score, the first aggregate audible score, the second aggregate visual content score, and the second aggregate audible score.

14. The method of claim 13, further comprising:
    determining region policy data associated with a region for which the video summary is to be generated;
    determining region constraint data associated with the region; and
    determining that the first segment is more relevant than the second segment using the first metadata, the second metadata, the third metadata, the user preference data, the region policy data, and the region constraint data.

15. The method of claim 5, further comprising:
    determining that a content card associated with the digital content is selected at a user interface, wherein a plurality of content cards are presented at the user interface; and
    causing presentation of the video summary at the content card.

16. A system comprising:
    memory configured to store computer-executable instructions; and
    at least one computer processor configured to access the memory and execute the computer-executable instructions to:
       determine a first segment of digital content, the first segment comprising a first set of frames, first textual content, and first audio content;
       determine, using one or more object recognition algorithms, a first event that occurs in the first set of frames;
       determine a first theme of the first event;
       generate first metadata indicative of the first theme;
       determine, using one or more natural language processing algorithms, a meaning of a first sentence that occurs in the first textual content;
       determine a second theme of the first sentence;
       generate second metadata indicative of the second theme;
       determine that user preference data associated with an active user profile comprises the first theme and the second theme; and generate, using the first metadata and the second metadata, a video summary comprising a portion of the first segment of digital content.

17. The system of claim 16, wherein the at least one processor is further configured to access the memory and execute the computer-executable instructions to:
   determine a first visual content score for the first event indicative of an importance of the first event;
   determine a second event that occurs in the first set of frames;
   determine a second visual content score for the second event; and
   determine that the first visual content score is greater than the second visual content score.

18. The system of claim 16, wherein the at least one processor is further configured to access the memory and execute the computer-executable instructions to:
   determine, using one or more audio processing algorithms, a second event that occurs in the first audio content;
   determine that the second event corresponds to the first event; and
   determine that a theme of the second event is the first theme.

19. The system of claim 16, wherein the at least one processor is further configured to access the memory and execute the computer-executable instructions to:
   determine a first audible score for the first sentence indicative of an importance of the first sentence;
   determine a meaning of a second sentence that occurs in the first textual content;
   determine a second audible score for the second sentence;
   determine a third audible score for the second event; and
   determine that the first audible score is greater than the second audible score and the third audible score.

20. The system of claim 16, wherein the at least one processor is further configured to access the memory and execute the computer-executable instructions to:
   determine a first aggregate visual content score for the first segment;
   determine a first aggregate audible score for the first segment;
   determine a second segment of digital content comprising a second set of frames, second textual content, and second audio content;
   determine a second event that occurs in the second set of frames;
   generate third metadata indicative of a third theme of the second event;
   determine a second aggregate visual content score for the second segment;
   determine a second aggregate audible score for the second segment; and
   determine that the first segment is more important than the second segment using the first aggregate visual content score, the first aggregate audible score, the second aggregate visual content score, and the second aggregate audible score.

* * * * *